United States Patent [19]

Bosch

[11] 3,988,892

[45] Nov. 2, 1976

[54] REGULATING ARRANGEMENT FOR HYDRAULIC PUMPS

[75] Inventor: Paul Bosch, Ludwigsburg, Germany

[73] Assignee: Robert Bosch G.m.b.H., Stuttgart, Germany

[22] Filed: Nov. 13, 1975

[21] Appl. No.: 631,516

[30] Foreign Application Priority Data

Nov. 19, 1974 Germany............................ 2454732

[52] U.S. Cl..................................... 60/420; 60/428; 60/431; 60/486; 180/6.48; 417/216
[51] Int. Cl.².................... F15B 13/09; F16H 39/46
[58] Field of Search ............ 60/388, 420, 426, 427, 60/428, 430, 431, 443, 486; 180/6.48; 417/216

[56] References Cited
UNITED STATES PATENTS

| | | | |
|---|---|---|---|
| 3,500,633 | 3/1970 | Livezey | 60/427 X |
| 3,504,493 | 4/1970 | Potter et al. | 60/422 X |
| 3,672,161 | 6/1972 | Krusche et al. | 60/420 |
| 3,795,107 | 3/1974 | Ward | 60/428 X |
| 3,891,354 | 6/1975 | Bosch | 417/216 |

*Primary Examiner*—Edgar W. Geoghegan
*Attorney, Agent, or Firm*—Michael J. Striker

[57] ABSTRACT

Two adjustable-stroke pumps are driven off a common drive shaft and supply fluid to respective consumers via respective control valves settable by the user of the system. Each pump is provided with its own pressure regulator operative for regulating the output pressure of the respective pump by automatically adjusting the setting of the stroke-adjustment member of the pump. Transducers generate first signals indicative of the settings of the stroke adjustment members and second signals indicative of the settings of the control valves. A control arrangement maintains the settings of the volume-adjustment members in correspondence with the settings of the control valves by automatically altering the operation of the pressure regulators in response to discrepancies between the settings indicated by the first and second signals. An anti-overload arrangement responds to overloading of the common drive machine for the pumps by altering the operation of the regulators in a way decreasing the stroke of one or both pumps. However, even during the anti-overload stroke decrease, the relative settings of the plurality of stroke-adjustment members are maintained in correspondence with the relative settings of the plurality of control valves.

11 Claims, 3 Drawing Figures

REGULATING ARRANGEMENT FOR HYDRAULIC PUMPS

BACKGROUND OF THE INVENTION

Commonly owned U.S. Pat. No. 3,891,354, the entire disclosure of which is incorporated herein by reference, teaches a regulating arrangement for regulating the pressure and torque of at least two adjustable-stroke pumps driven by a common drive machine. Each adjustable-stroke pump is provided with a regulator of its own. Each regulator is operative for regulating the pump output pressure by automatically adjusting the stroke of the pump. The regulating arrangement of that patent is furthermore provided with means for detecting overload of the common drive machine for the pumps. When the common drive machine is about to become overloaded, the overload detector activates an antioverload arrangement which alters the operation of one or more of the pressure regulators in a sense causing the strokes of the associated pumps to be automatically decreased until such a point as the overload situation has been corrected.

If an arrangement of the type disclosed in that patent comprises two hydraulic motors, each driven by one of two adjustable-stroke pumps, and respectively associated with the left and right caterpillar tracks, or the left and right wheels, of a vehicle, then steering of the vehicle may become extremely difficult in certain situations. For example, if the resistance to travel encountered by the left caterpillar track suddenly increases, without a corresponding increase in the resistance encountered by the right track, then the loading of the left hydraulic motor and left drive pump will suddenly increase relative to the loading of the right motor and right drive pump. The pressure regulator associated with the left drive pump will compensate by automatically decreasing the stroke of the left pump. However, the stroke of the right pump will not be correspondingly decreased. Inasmuch as both pumps are driven at the same rotary speed by a common drive machine, the volumetric output of the left pump will suddenly drop considerably below the volumetric output of the right pump. As a result, the speed of the left hydraulic motor will suddenly drop considerably below the speed of the right hydraulic motor, and the vehicle will abruptly swerve to the left. This is both annoying and potentially dangerous.

In the aforementioned patent, this situation is even worse, because of the provision of the anti-overload arrangement. If a load is suddenly applied to just one of the left and right drive pumps, and if the load is so great as to threaten to overload the common drive machine, then the anti-overload arrangement alters the operation of the left pressure regulator in a sense causing an even faster stroke decrease of the left pump than would occur under ordinary operation of the left pressure regulator. This can cause particularly violent swerving of the vehicle.

SUMMARY OF THE INVENTION

It is a general object of the invention to modify the general type of hydraulic system disclosed in commonly owned U.S. Pat. No. 3,891,354 in a way which will prevent the aforedescribed swerving of a vehicle powered by such a system.

It is another object of the invention to modify the type of hydraulic system in question in such a manner that auxiliary consumers, e.g., excavating shovels, can be operated as to avoid pressure fluid and power losses, in a way described below.

These objects, and others which will become clearer below, can be met according to one advantageous concept of the invention by generating first signals indicative of the stroke settings of the adjustable-stroke pumps and second signals indicative of the settings of a corresponding plurality of control valves, each control valve being connected in the fluid path leading from the associated pump to the associated hydraulic consumer. Each pump is provided with its own pressure regulator. If the relative settings of the stroke-adjustment members of the plurality of adjustable-stroke pumps correspond to the relative settings of the control valves associated with the different driven motors, then the pressure regulators are independently operative for regulating the output pressure of the associated adjustable-stroke pumps. However, if the relative settings of the stroke-adjustment members of the pumps fall out of correspondence with the relative settings of the control valves, then the operation of one or more of the pressure regulators is automatically altered in a manner causing the correspondence to be re-established. If the common drive machine for the pumps becomes overloaded, an anti-overload arrangement alters the operation of one or more of the pressure regulators to decrease the loading of the drive machine as quickly as possible. However, the anti-overload action is automatically modified to the extent necessary to maintain the relative settings of the plurality of stroke-adjustment members at least approximately in correspondence with the relative settings of the plurality of control valves. In this way, despite the automatic anti-overload action, the vehicle will not suddenly swerve but will instead continue in its desired direction of travel, e.g., a straight line.

By means of an auxiliary arrangement for the control of an excavating shovel, or other auxiliary consumer, the strokes of the pumps are each automatically adjusted in dependence upon the settings of associated control valves in such a manner that the drive pumps supply only the flow volumes actually required by the auxiliary consumer, so as to avoid pressure fluid losses and power waste.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
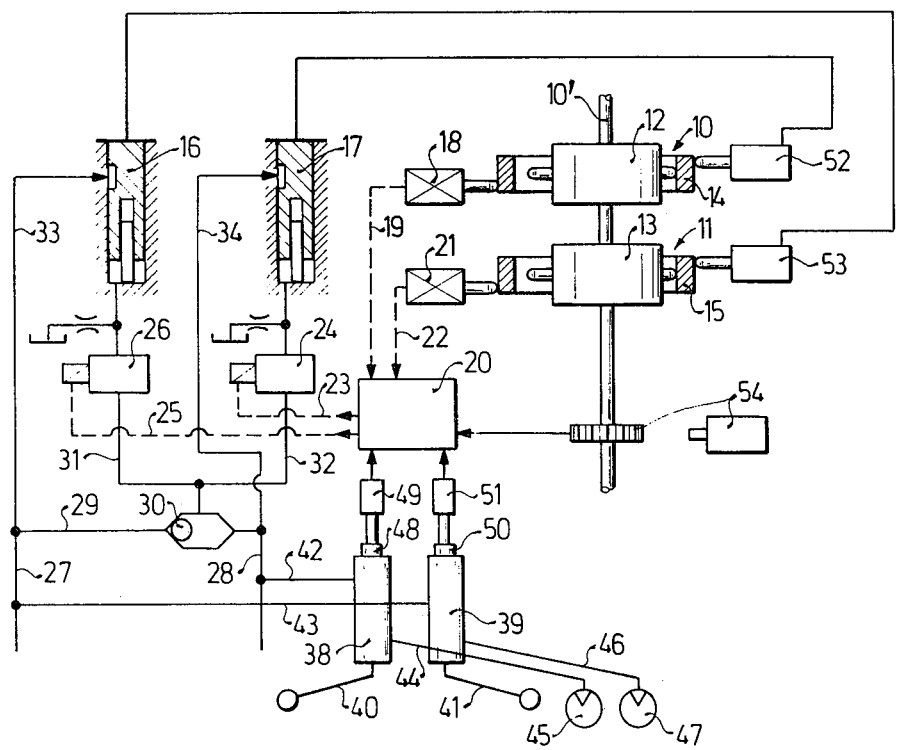
FIG. 1 depicts a regulating and control arrangement for a hydraulic system comprised of two adjustable-stroke pumps driving respective hydraulic motors.

In FIG. 1 reference numerals 10 and 11 identify two adjustable-stroke radial-piston pumps. Each pump includes a rotor 12 or 13 and a stroke-establishing cam ring 14 or 15. By changing the eccentricity of the cam ring 14 or 15 the stroke of the associated pump can be adjusted. Provided in the rotors of the pumps are radial pistons which slide along the inner surfaces of the cam rings. The basic construction of adjustable-stroke radial-piston pumps of this type is very well known.

Each pump 10 or 11 is provided with its own pressure regulator 16 or 17. The pressure regulators are disclosed in detail in commonly owned U.S. Pat. No. 3,891,354, the entire disclosure of which is incorporated herein by reference. For the purpose of explaining the present invention, it is sufficient to note that the output line of pump 10 is designated with numeral 27, and the output line of pump 11 with numeral 28. Pump output conduits 27, 28 having respective branches 33, 34 lead into the associated regulators, for furnishing the regulators with information concerning the output pressure of the pumps. If the pressure fed back to regulator 16 via line 33 indicates that the pressure in pump output conduit 27 is greater or less than the preselected value, then the pressure regulator 16 effects a corresponding change in the fluid pressure supplied to hydraulic adjuster 52, and the hydraulic adjuster will change the eccentricity of the cam ring 14, and thereby the stroke of pump 10, until the pump output pressure reassumes the preselected value. The operation of pressure regulator 17 is the same.

Each pressure regulator 16, 17 is shown as having a further inlet at its bottom end. Normally, pressure is not applied to this further inlet. However, when associated valve 26 or 24 is opened additional pressure is applied. The effect of this additional pressure is to alter the operation of the regulator in a sense causing the regulator to decrease the stroke of the associated pump. This is explained in considerable detail in the aforementioned patent. The purpose of valves 26, 24 in the present invention will be described below. However, it should be noted here that if the output pressure of one of the pumps suddenly increases, and the associated value 26 or 24 is not open, then the associated pressure regulator 16 or 17 will simply restore the preselected pressure. However, if in addition the associated valve 26 or 24 is opened, the operation of the regulator will be altered in a sense causing the regulator to more quickly change the setting of the respective cam ring towards the minimum-stroke setting.

The illustrated hydraulic system includes a pair of first transducers 18, 21 respectively operative for furnishing via lines 19 and 22 first signals indicative of the eccentricity of respective ones of the cam rings 14 and 15, and accordingly indicative of the strokes of the respective pumps. Lines 19 and 22 feed into an electronic control device 20, whose operation is described below.

The pump rotors 12 and 13 are mounted on a common drive shaft 10' driven by a common (non-illustrated) drive machine. It is clear that the rotary speeds of pump rotors 12 and 13 must always be the same.

A rotary speed transducer 54 detects the rotary speed of the common drive shaft 10'and furnishes a corresponding electrical signal to the electronic control device 20. The rotary speed transducer 54 serves the purpose of an overload detector for the common drive machine. When the common drive machine, whether an engine or a motor, becomes overloaded, its speed will fall below a certain value, and this will be indicated by the signal from transducer 54. It will be understood, however, that more sophisticated load-measuring transducers can be utilized, if desired.

The electronic control device 20 has two electrical outputs 23 and 25 respectively leading to the control solenoids of valves 26 and 24. The valves 26 and 24 constitute anti-overload override valves. When opened, they override or alter the normal operation of the associated pressure regulator in a sense causing the regulator to decrease the stroke of the respective pump towards minimum stroke. And they are activated for performing this override function under the control of the control device 20, in a manner described below, when overloading of the common drive machine for the pumps is about to occur.

The output conduits 27, 28 of the pumps 10, 11 are connected with each other by a conduit 29 containing a changeover valve 30. Branching away from the outlet of changeover valve 30 are two conduits 31, 32 leading into the inlets of respective ones of the anti-overload override valves 26, 24. The effect of changeover valve 30 is to transmit to one or both of the pressure regulators 16, 17, via the valves 26, 24, the output pressure from that one of the two pumps having the higher output pressure.

The illustrated hydraulic system is used to drive the left and right caterpillar tracks of an excavating shovel vehicle. The left and right caterpillar tracks are directly driven by hydraulic motors 45 and 47. Hydraulic motor 45 receives pressure fluid from pump outlet 28 via a conuit 42, a slider valve 38, and a conduit 44. Hydraulic motor 47 receives pressure fluid from pump outlet 27 via a conduit 43, a slider valve 39 and a conduit 46.

The slider valves 38, 39 are comprised of respective control slides 48, 50 whose settings are indicated in the form of second signals generated by respective second transducers 49, 51. These second signals are fed to the electronic control device 20.

The settings of the slider valves 38 and 39 are selected by means of sellector handles 40 and 41.

The arrangement of FIG. 1 operates as follows:

If it is desired that the vehicle travel in a straight line, the two selector levers 40, 41 will be turned to identical positions, causing the valves 38, 39 to assume identical settings. During normal operation, i.e., when the loads applied to the hydraulic drive motors 45, 47 by the respective caterpillar tracks are substantially identical, the pressure regulators 16, 17 will cause the cam rings 14, 15 of the two pumps to assume identical settings, so that the speeds of rotation of the motors 45, 47 and, accordingly the travel speeds of the left and right caterpillar tracks, will be identical.

However, if now the load applied to one of the two motors suddenly increases, the associated pressure regulator will begin to decrease the stroke of the respective pump. Accordingly, the eccentricity of the two cam rings 14, 14 will become different; more generally expressed, the relative settings of the two cam rings 14, 15 will no longer correspond to the relative settings of the two control valves 38, 39. If not corrected, this action of the pressure regulator would cause the motors 45 and 47 to run at unequal speeds.

The electronic control device 20 maintains the relative settings of the cam rings 14, 15 in correspondence with the relative settings of the control valves 38, 39. It detects the relative values of the first signals in lines 19 and 22, and it detects the relative values of the second signals from transducers 49, 51. If the relationship between the values of the first signals does not correspond to the relationship between the values of the second signals, one or the other of valves 26, 24 is opened, to cause a decrease in the eccentricity of one of the two cam rings 14, 15 until such time as the relationship between the settings of the cam rings comes again into correspondence with the relationship between the settings of the valves 38, 39.

Control device 20 can have any of many different forms. For example, it may be a ratio regulator operative for maintaining the ratio of the signals in lines 19 and 22 equal to the ratio of the signals from transducers 49 and 50 by automatically opening one or the other of valves 26, 24 when the ratios become unequal.

If the common drive machine for the two pumps 10, 11 becomes overloaded, an overload signal is fed by transducer 54 to the control device 20. This causes control device 20 to open one or both of valves 26, 24, in an attempt to counteract the overload more quickly than would occur under the normal operation of the pressure regulators. The control device 20 can be designed in any of a variety of ways to provide this quick anti-overload action. For example, in response to detection of drive machine overload it can simply open both the valves 26 and 24. In the event that opening of both valves 26, 24 in an overload situation should happen to cause the ratio of the signals in lines 19, 22 to fall out of correspondence with the ratio of the signals from transducers 49, 51, then the control device 20 can be operative for closing one of the valves 26, 24, either uninterruptedly or else intermittently, to maintain the desired correspondence between the two ratios. Whereas this would somewhat decrease the quickness of the quick anti-overload override action, unexpected sudden swerving of the vehicle will be prevented.

Figure 2:
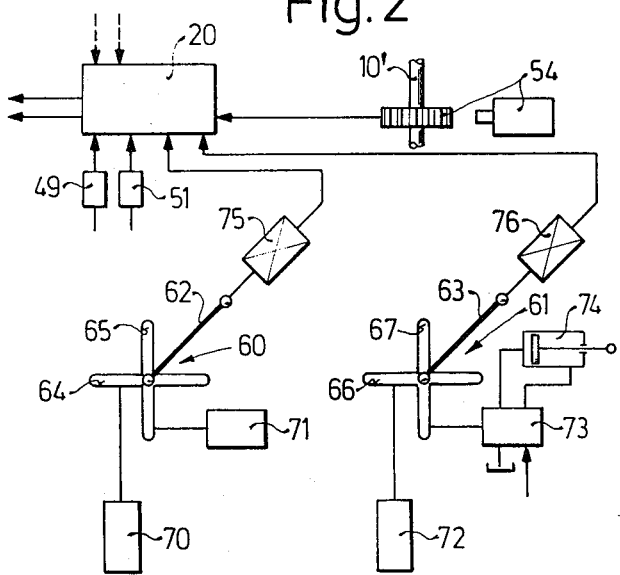
FIG. 2 is a schematic depiction of an addition to the arrangement of FIG. 1.
Figure 3:
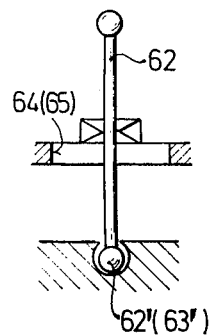
FIG. 3 depicts a detail of the arrangement of FIG. 2.

In the embodiment of FIG. 2, there is added to the arrangement of FIG. 1 the controls for the excavating shovel of the machine. The control of the excavating shovel is effected by means of two control arrangements 60, 61 of identical design. The manually activatable control levers 62, 63 are mounted in a universal joint and are guided in mutually perpendicular guide slots 64, 65 and 66, 67. The settings of the control levers 62, 63 determine the settings of the control valves 70, 71 and 72, 73. The valves 70–73 control the movements of the hydraulic cylinders (e.e., 74) for the derrick, the shovel stem, the shovel bottom flap and the turning means for the shovel.

Cooperating with the control lever 62 is a position transducer 75, whereas the control lever 63 is provided with a position transducer 76. These transducers furnish position-indicating signals to the control device 20 of FIG. 2. The output signals of transducers 75, 76 are compared by the control device 20 against the signals indicative of the settings of the stroke-adjustment members of the pumps 10 and 11. The control device 20 of FIG. 2, in dependence upon the lack of correspondence between the two sets of signals, controls the solenoid valves 24, 26 to cause the associated pressure regulators to prevent the pumps 10, 11 from furnishing the working cylinders pressure fluid in excess of what is actually needed; i.e., corresponding to the setting of the control levers 62, 63. With this additional control action the output volumes of the pumps can be set in dependence upon the settings of the activated ones of control valves 70–73. In this way, pressure fluid losses and power waste can be avoided.

It will be understood that each of the elements described above, or two or more together, may also find a useful application in other types of constructions differing from the types described above.

While the invention has been illustrated and described as embodied in an excavating shovel machine having left and right caterpillar tracks driven by separate hydraulic motors and hydraulic drive pumps, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential charcteristics of the generic or specific aspects of this invention.

What is claimed as new and desired to be protected by Letters Patent is set forth in the appended claims.

I claim:

1. An hydraulic system, comprising, in combination, a common drive machine; a plurality of adjustable-volume pumps driven by the common drive machine and each having a respective volume-adjustment means; a plurality of hydraulic consumers each receiving fluid from and driven by a respective one of the adjustable-volume pumps; a plurality of control valves individually settable by the user of the hydraulic system, each located in the fluid path leading from a respective one of the pumps to a respective one of the consumers; a plurality of pressure regulators, each associated with and regulating the output of a respective one of the adjustable-volume pumps by automatically adjusting the setting of the respective volume-adjustment means; a plurality of first transducers operative for generating first signals indicative of the settings of respective ones of the volume-adjustment means; a plurality of second transducers operative for generating second signals indicative of the settings of respective ones of the control valves; and control means operative for maintaining the settings of the volume-adjustment means in correspondence with the settings of the control valves by automatically altering the operation of the pressure regulators in response to discrepancies between the settings indicated by the first and second signals.

2. The hydraulic system defined in claim 1, wherein the control means comprises means operative for maintaining the settings of the volume-adjustment means in correspondence with the settings of the associated control valves by automatically altering the operation of at least one of the pressure regulators in a sense causing the regulator to change the setting of the associated volume-adjustment means towards the setting corresponding to minimum volume, in response to discrepancies between the settings indicated by the first and second signals.

3. The hydraulic system defined in claim 1, wherein the control means comprises a plurality of override valve means, each associated with a respective one of the pressure regulators, and each operative when activated for causing the associated pressure regulator to change the setting of the associated volume-adjustment means towards a setting corresponding to minimum volume, and means for maintaining the settings of the volume-adjustment means in correspondence with the settings of the control valves by automatically activating at least one of the override valve means in response to discrepancies between the settings indicated by the first and second signals.

4. The hydraulic system defined in claim 1, further including means for generating a load-indicating signal indicative of the loading of the common drive machine, and means operative when the load-indicating signal indicates that the drive machine is about to become overloaded for automatically altering the operation of at least one of the pressure regulators in a sense causing the pressure regulator to change the setting of the associated volume-adjustment means towards the setting corresponding to minimum volume.

5. The hydraulic system defined in claim 1, wherein the plurality of hydraulic consumers comprise two hydraulic motors respectively driving the left and right caterpillar treads of a caterpillar vehicle.

6. The hydraulic system defined in claim 1, wherein the plurality of hydraulic consumers comprise two hydraulic motors respectively driving the left and right wheels of a vehicle.

7. The hydraulic system defined in claim 1, wherein the pumps are radial-piston pumps having adjustable-eccentricity cam rings constituting the volume-adjustment means, and wherein the first transducers are operative for generating the first signals as indications of the eccentricity of the cam rings.

8. The hydraulic system defined in claim 1, wherein the control valves are sliding-spool valves, and wherein the second transducers are operative for generating the second signals as indications of the spool positions of the sliding-spool valves.

9. The hydraulic system defined in claim 1, further including additional hydraulic consumers supplied by the adjustable-volume pumps and additional control valves for controlling the flow of fluid from the pumps to the additional consumers, and additional transducers for generating additional signals indicative of the settings of the additional control valves, and wherein the control means further includes means for altering the operation of at least one of the pressure regulators as a function of the differences between the first signals and the additional signals.

10. The hydraulic system defined in claim 1, wherein the control means comprises means for maintaining the relative settings of the plurality of volume-adjustment means in correspondence with the relative settings of the plurality of control valves by automatically altering the operation of the pressure regulators when the relative values of the first signals fall out of correspondence with the relative values of the second signals.

11. The hydraulic system defined in claim 1, wherein the control means comprises a plurality of override valve means, each associated with a respective one of the pressure regulators, and each operative when activated for causing the associated pressure regulator to change the setting of the associated volume-adjustment means towards a setting corresponding to minimum volume, means for generating an overload signal when the common drive machine is about to become overloaded, and means automatically operative in response to an overload signal for activating the override valve means and controlling their operation to maintain the relative settings of the plurality of volume-adjustment means in correspondence with the relative settings of the plurality of control valves during the automatic volume decrease effected by the override valve means.

* * * * *